United States Patent
Benchikhi

(10) Patent No.: US 10,696,162 B2
(45) Date of Patent: Jun. 30, 2020

(54) DEVICE FOR CONTROLLING A FUNCTION OF A VEHICLE COMPRISING A MOVABLE DRIVING DEVICE

(71) Applicant: Faurecia Interieur Industrie, Nanterre (FR)

(72) Inventor: Zakaria Benchikhi, Paris (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 15/461,755

(22) Filed: Mar. 17, 2017

(65) Prior Publication Data

US 2017/0267101 A1 Sep. 21, 2017

(30) Foreign Application Priority Data

Mar. 18, 2016 (FR) ...................... 16 52351

(51) Int. Cl.
*B60K 37/02* (2006.01)
*B60K 35/00* (2006.01)
(Continued)

(52) U.S. Cl.
CPC .............. *B60K 37/02* (2013.01); *B60K 35/00* (2013.01); *B60K 37/04* (2013.01); *B60K 37/06* (2013.01); *B60R 11/0264* (2013.01); *G06F 1/1601* (2013.01); *G06F 3/044* (2013.01); *B60K 2370/1438* (2019.05); *B60K 2370/1446* (2019.05); *B60K 2370/152* (2019.05);
(Continued)

(58) Field of Classification Search
CPC ........ B60K 37/02; B60K 37/06; B60K 37/04; B60K 2350/941; B60K 2350/903; B60K 2350/901; B60K 2350/106; B60K 2350/1036; B60K 2350/405; B60K 2350/102; B60K 35/00; B60R 11/0264; B60R 2011/0084; G06F 3/044; G06F 1/1601

See application file for complete search history.

(56) References Cited

U.S. PATENT DOCUMENTS

| 2006/0071135 A1* | 4/2006 | Trovato ................. F16M 11/18 248/289.11 |
| 2006/0155431 A1* | 7/2006 | Berg ..................... B60K 35/00 701/2 |

(Continued)

FOREIGN PATENT DOCUMENTS

| DE | 102009037680 A1 | 2/2011 |
| DE | 102011121265 A1 | 6/2013 |

(Continued)

OTHER PUBLICATIONS

French Search Report in French for application no. FR1652351, dated Jan. 9, 2017, 2 pages.

*Primary Examiner* — Kenneth Bukowski
(74) *Attorney, Agent, or Firm* — Reising Ethington P.C.

(57) ABSTRACT

A control device includes a driving device for controlling a function of a vehicle, a display device for at least one piece of information relative to this function, and a receiving surface of the driving device and the display device. The control device is mounted translatably on the receiving surface and relative to the display device. The distance between the display device and the driving device is adjustable by moving the control device relative to said the display device.

12 Claims, 3 Drawing Sheets

(51) Int. Cl.
    *B60K 37/06*         (2006.01)
    *B60R 11/02*         (2006.01)
    *B60K 37/04*         (2006.01)
    *G06F 1/16*          (2006.01)
    *G06F 3/044*         (2006.01)
    *B60R 11/00*         (2006.01)

(52) U.S. Cl.
    CPC .... *B60K 2370/67* (2019.05); *B60K 2370/736* (2019.05); *B60K 2370/739* (2019.05); *B60K 2370/81* (2019.05); *B60R 2011/0005* (2013.01); *B60R 2011/0084* (2013.01)

(56) References Cited

U.S. PATENT DOCUMENTS

2014/0043269 A1*   2/2014   Kuhn ................... B60K 35/00
                                                                 345/173
2014/0095000 A1*   4/2014   Waller .................. B60K 37/06
                                                                  701/2
2014/0263511 A1*   9/2014   Clements ............... B60R 11/02
                                                                   224/483

FOREIGN PATENT DOCUMENTS

DE       202013010582 U1   12/2013
WO     WO2012110020 A1    8/2012

\* cited by examiner

DEVICE FOR CONTROLLING A FUNCTION OF A VEHICLE COMPRISING A MOVABLE DRIVING DEVICE

TECHNICAL FIELD

The present invention relates to a device for controlling at least one function of a vehicle, of the type comprising a driving device for said function, a device for displaying at least one piece of information relative to said function and a surface for receiving said driving device and said display device.

The invention also relates to a vehicle trim element comprising such a control device and a vehicle comprising such a trim element.

BACKGROUND

In vehicles, for example motor vehicles, it is known to provide a device for controlling certain functions of the vehicle that is accessible both to the driver and the front passenger of the vehicle. The controlled functions are for example the adjustment of the air conditioning, the control of a car radio or the like. Such a control device generally comprises a driving device making it possible to drive the desired function(s) and a display device making it possible to display the information relative to the functions. The two devices are grouped together within a same unit, the driving device for example extending around a screen forming the display device. It is also known to produce a touch-sensitive display device in which the driving device extends directly on the screen, the interaction with the driving device being done by touching the screen.

Such control devices are generally provided so that access priority is given to the driver of the vehicle, so that the latter may use it when he is alone in the vehicle. The control device is then relatively impractical for the passenger to use, who must enter an uncomfortable position or ask the driver to use the control device. This may be dangerous for the proper driving of the vehicle.

It has been proposed to produce a movable control device making it possible to arrange the control device closer to the driver or the passenger depending on the person who wishes to use the control device. However, in this case, the screen may be concealed by the passenger when he uses the control device, such that the driver and/or the passengers in the back seat of the vehicle can no longer see the information displayed on this screen.

SUMMARY

One of the aims of the invention is to overcome these drawbacks by proposing a control device remaining visible for all of the occupants of the vehicle while being ergonomically drivable by the driver or front passenger of the vehicle.

To that end, the invention relates to a control device of the aforementioned type, wherein said control device is mounted translatably on the receiving surface and relative to the display device, the distance between the display device and the driving device being adjustable by moving said driving device relative to said display device.

By making the driving device movable relative to the display device, it is possible to move the driving device toward the front passenger of the vehicle while leaving the display device visible for all of the occupants of the vehicle, for example by arranging it between the front seats of the vehicle. Thus, the passenger can drive the function(s) of the vehicle ergonomically and without asking the vehicle's driver, but without concealing the display device.

According to other features of the control device, considered alone or according to any technically possible combinations:

- actuating the driving device is arranged to modify the information displayed by the display device;
- the driving device and the display device are connected to a shared computer able to process the signals from the driving device and send driving signals to the display device;
- the driving device is formed by a capacitive film extending over a support, said support being mounted translatably on the receiving surface;
- the display device is fixed on the receiving surface and translatably immobile relative to said receiving surface;
- the driving device comprises at least one guide element cooperating with a rail formed in the receiving surface so as to allow the translation of the driving device on the receiving surface; and
- the driving device comprises two guide elements extending on either side of said driving device and cooperating with two rails formed in the receiving surface.

The invention also relates to a vehicle trim element comprising such a control device as described above, in which the receiving surface is formed by at least part of the outer surface of the trim element.

The invention also relates to a vehicle comprising at least a driver seat, a passenger seat and a trim element as described above, in which the trim element extends opposite the driver seat and the passenger seat, or between the driver seat and the passenger seat, the control device being arranged such that the display device extends substantially between the driver seat and the passenger seat.

According to another feature of the vehicle, the driving device is movable between an extreme close position, in which the driving device is adjacent to the display device, and an extreme distant position, in which the driving device extends opposite the passenger seat of the vehicle or between the driver seat and the passenger seat.

BRIEF DESCRIPTION OF THE DRAWINGS

Other aspects and advantages of the invention will appear upon reading the following description, provided as an example and done in reference to the appended drawings, in which.

DETAILED DESCRIPTION

Figure 1:
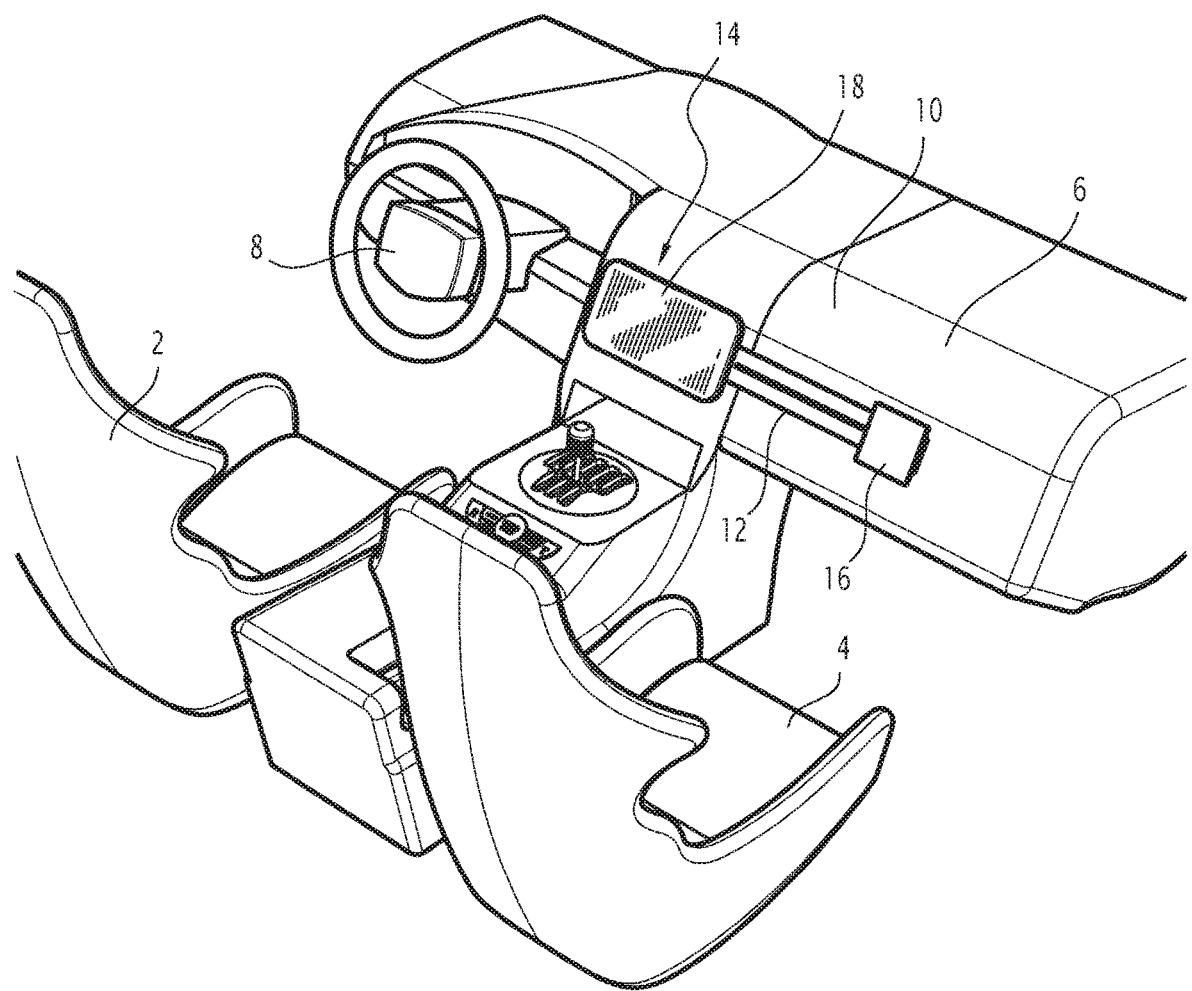
FIG. 1 is a diagrammatic perspective illustration of part of a vehicle passenger compartment comprising a trim element according to the invention.

In reference to FIG. 1, a vehicle is described, for example a motor vehicle, comprising a driver seat 2, a front passenger seat 4 and a trim element extending opposite the driver seat 2 and the passenger seat 4 or between the driver seat 2 and the passenger seat 4. Such a trim element is for example a dashboard 6, as shown in FIG. 1. It is, however, understood that the invention applies to other types of trim elements. In the rest of the description, the embodiment in which the trim element is a dashboard 6 will be described.

Traditionally, the dashboard 6 supports different functional elements of the vehicle, such as the steering wheel 8 positioned opposite the driver seat 2, driving instruments of the vehicle and devices for displaying information relative to driving, air conditioning means, audio means such as speakers, a glovebox, and other known functional elements. These elements extend over or protrude from an outer surface 10 of the dashboard 6, generally formed by a trim element, such as a skin or the like, arranged to impart a satisfactory appearance to the dashboard 6.

According to the embodiment shown in the figures, part of the outer surface 10 of the dashboard 6 forms the receiving surface 12 for a device 14 for controlling at least one function of the vehicle.

Aside from the receiving surface 12, the control device 14 comprises a driving device 16 for the function and a display device 18 for at least one piece of information relative to this function.

When the driving device 16 is actuated, it makes it possible to drive one or several functions of the vehicle. Thus, for example, the driving device 16 makes it possible to drive the ventilation system, the audio system, a navigation system to assist the driver, the lighting of the passenger compartment or the like. To that end, the driving device 16 is electronically connected to a computer (not shown) arranged, in a known manner, to send driving signals to the elements performing the function(s) based on the actuation by a user of the driving device 16.

The driving device 16 is for example formed by a capacitive film 20 arranged on a support 22, for example formed by a decorative element offering a satisfactory appearance to the driving device 16. The capacitive film 20 is for example transparent or translucent, such that the support 22 is visible through the capacitive film 20. One or several icons 24 are printed on the capacitive film 20 or on the support 22 opposite control areas of the capacitive film 20. The control areas of the capacitive film 20 are arranged to transmit driving signals to the computer when they are touched by a user. Thus, the driving device 16 is for example a touch-sensitive driving device. The capacitive film 20 is for example overmolded or glued on the support 22. Alternatively, the driving device 16 could be formed by switches or other mechanical driving buttons arranged to make it possible to drive the function(s) previously described. The use of a capacitive film 20 nevertheless has the advantage of taking up little space and making it possible to impart a particularly satisfactory appearance to the driving device 16 by choosing an appropriate decorative element as support 22.

Figure 2:
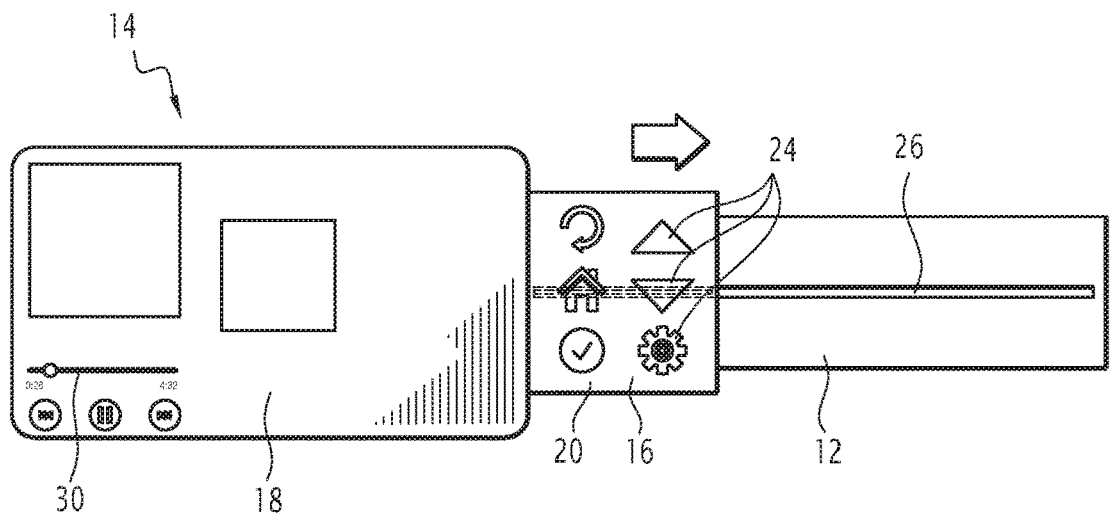
FIGS. 2 to 4 are diagrammatic front illustrations of the control device of FIG. 1, the driving device being in different positions.
Figure 3:
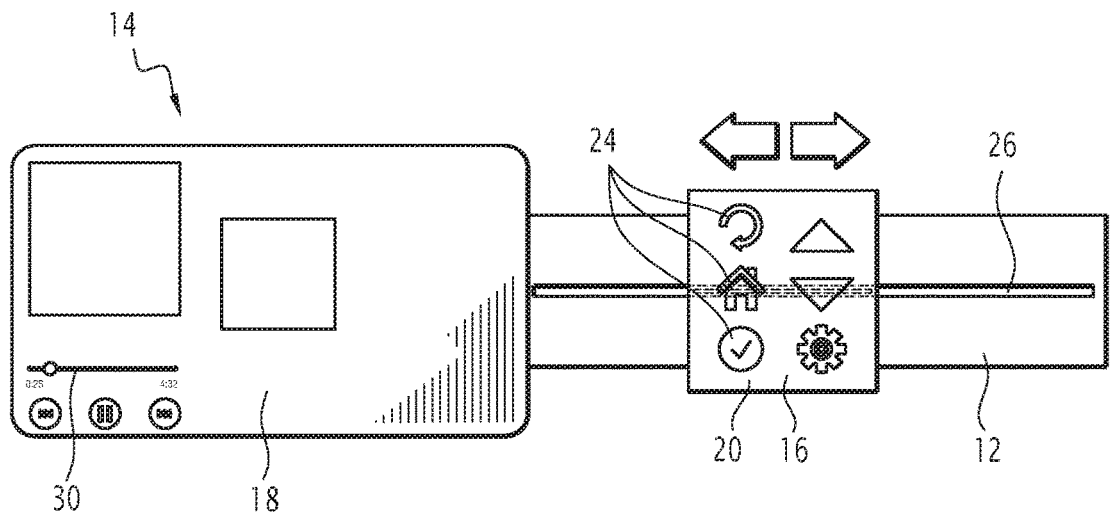
Figure 4:
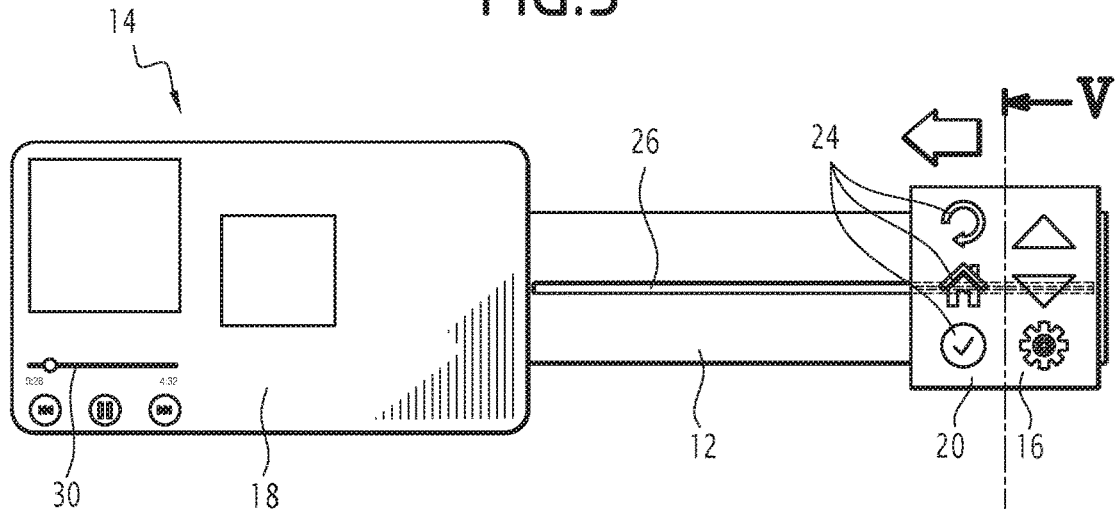

The driving device 16 is mounted translatably on the receiving surface 12 and relative to the display device 18, as shown in FIGS. 2 to 4. Thus, by moving the driving device 16, the distance between the driving device 16 and the display device 18 can be adjusted. More particularly, the driving device 16 is advantageously arranged to be translatable along a transverse direction of the vehicle, i.e., along the width of the vehicle so as to allow its position to be modified relative to the front seats of the vehicle.

Figure 5:
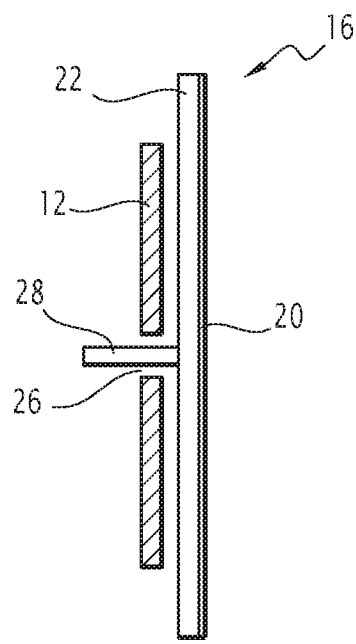
FIGS. 5 and 6 are diagrammatic sectional illustrations of the driving device of the control device of FIG. 1, respectively according to first and second embodiments of the invention.

To that end and according to the embodiment shown in FIGS. 2 to 5, the receiving surface 12 comprises a rail 26 extending along the transverse direction and in which a guide element 28 provided on the support 22 is slidingly mounted. The rail 26 is for example formed by a slit in the receiving surface 12 or can be defined by a space between two trim elements forming the outer surface 10 of the dashboard 6. The guide element 28 is for example formed by a lug extending on the face of the support 22 opposite the face on which the capacitive film 20 extends, as shown in FIG. 5.

Figure 6:
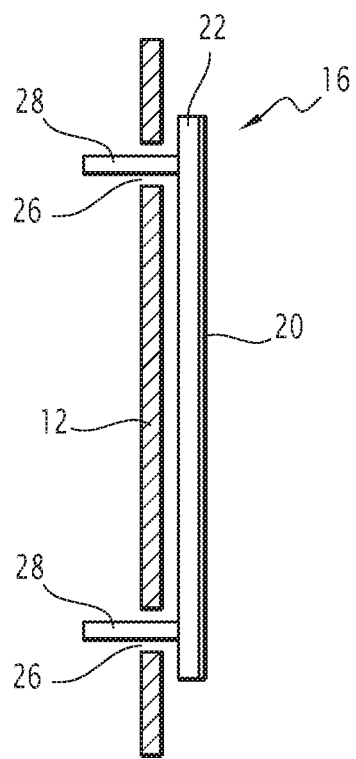

Alternatively and as shown in FIG. 6, two rails 26 are provided and the support 22 comprises two guide elements 28 arranged on either side of the support 22 and engaged in the rails 26. In this case, the rails 26 are for example formed by the edges of a decorative element arranged on the outer surface 10 of the dashboard. In this case, the support 22 is for example slidingly fitted on the decorative element, which extends in a transverse direction.

The connector technology between the driving device 16 and the computer is suitable for allowing the driving device 16 to move and for maintaining the connection between the driving device 16 and the computer irrespective of the position of the driving device 16. The connector technology is for example hidden by the receiving surface 12 so as not to be visible from the passenger compartment of the vehicle.

The driving device 16 is translatable between an extreme close position, shown in FIG. 2, and an extreme remote position, shown in FIGS. 1 and 4. In the extreme close position, the driving device 16 is arranged against the display device 18 or is adjacent to the display device 18, i.e., it is arranged near the display device 18. In this position, the driving device 16 for example extends in a central region of the dashboard 6, in which the driving device 16 is accessible for the driver of the vehicle. In the extreme remote position, the driving device 16 is separated from the display device 18 and for example extends opposite the passenger seat 4 of the vehicle or between the front seat 2 and the back seat 4 so as to be easily accessible to the passenger of the vehicle, who can thus drive the function(s) without having to adopt an uncomfortable position or without having to ask the driver.

The driving device 16 can also adopt a plurality of intermediate positions between the extreme close and remote positions, as shown in FIG. 3.

According to one embodiment, return means arranged to return the driving device 16 to its extreme close position after a certain nonuse time can be provided, which allows the driving device 16 to be in its position accessible to the driver when it is not being used by a passenger or when the driver is alone in the vehicle without the driver needing to adopt an uncomfortable position to bring the driving device back toward himself. Alternatively or furthermore, a driving device can be provided near the driver and be arranged to initiate a movement of the driving device 16 toward its close position when the driver wishes it. Such a driving element can also be provided near the passenger and be arranged to initiate a movement of the driving device 16 toward its remote position. Thus, the movement of the driving device 16 can be driven and done automatically, which prevents the occupants of the vehicle from having to adopt uncomfortable positions to move the driving device 16.

The display device 18 is for example formed by a screen making it possible to display information relative to the function(s) driven by the driving device 16. In other words, the actuation of the driving device 16 directly or indirectly modifies the information displayed by the display device 18. To that end, the display device 18 is electronically connected to the same computer as the driving device 16, the computer being arranged to transmit driving signals to the display device 18 in order to modify the information displayed by the display device 18 based on the driving signals generated by the driving device 16 or based on information from sensors provided in the vehicle. Thus, as an example, the display device 18 is for example able to display the temperature of the vehicle, information 30 relative to the audio system of the vehicle, information relative to the position of the vehicle, etc. The display device 18 is provided without means for driving the above functions, such that the functions can only be driven by the driving device 16. Alternatively, driving means are also integrated into the display device 18 such that the functions can also be driven by the display device 18, which allows both the driver and passenger to drive the functions of the vehicle.

According to one embodiment, the display device 18 is stationary relative to the receiving surface 12 of the driving device 16, i.e., the display device 18 is stationary in translation relative to the receiving surface 12 and the distance separating the display device 18 and the driving device 16 is only adjustable by moving the driving device 16. It may be provided that the display device 18 is stationary in translation in the transverse direction, but rotatable in order to adjust its orientation. According to another embodiment, the display device 18 may also be translatable in the transverse direction, independently of the driving device 16.

The display device 18 is advantageously arranged in a central area of the outer surface 10 of the dashboard 6, i.e., between the driver seat 2 and the passenger seat 4, so as to be visible for all passengers of the vehicle.

The control device 14 described above is therefore particularly ergonomic to use for both the driver and the passenger of the vehicle, who may use the driving device 16 comfortably and without hindering the visibility of the display device 18 for the other occupants of the vehicle.

It should be noted that the description has been done in reference to a receiving surface 12 formed by the outer surface of a dashboard. However, the invention may also apply in the same manner by arranging the control device on another part of the vehicle, for example by providing that part of the outer surface of another trim element 6 forms the receiving surface 12 of the control device 14. Thus, the control device 14 could for example be used to drive a screen from the back seats of the vehicle, by providing that the receiving surface 12 extends behind the front seats of the vehicle, for example. Such a device could also be provided at the ceiling of the vehicle or in still other locations.

According to one alternative, the display device 18 could be formed by the screen of a nomad electronic device, such as a smartphone or the like, received in a docking station provided on the receiving surface. In this case, the driving device 16 is arranged to drive the nomad electronic device.

The invention claimed is:

1. A control device for controlling at least one function of a vehicle, comprising a driving device for driving said function, a display device for displaying at least one piece of information relative to said function and a surface for receiving said driving device and said display device, wherein said driving device is mounted translatably on the receiving surface and relative to the display device, the distance between the display device and the driving device being adjustable by moving said driving device relative to said display device, wherein the display device is fixed on the receiving surface and translatably immobile relative to said receiving surface, and wherein the display device is mounted in a central area of the dashboard between a driver seat and a passenger seat of the vehicle such that the display device is configured to extend substantially between the driver seat and the passenger seat of the vehicle, wherein the driving device is movable between an extreme close position, in which the driving device is adjacent to and is applied against the display device, and an extreme distant position, in which the driving device extends opposite the passenger seat of the vehicle or between the driver seat and the passenger seat.

2. The control device according to claim 1, wherein the actuation of the driving device is arranged to modify the information displayed by the display device.

3. The control device according to claim 1, wherein the driving device and the display device are connected to a shared computer able to process the signals from the driving device and send driving signals to the display device.

4. The control device according to claim 1, wherein the driving device is formed by a capacitive film extending over a support, said support being mounted translatably on the receiving surface.

5. The control device according to claim 1, wherein the driving device comprises at least one guide element cooperating with a rail formed in the receiving surface so as to allow the translation of the driving device on the receiving surface.

6. The control device according to claim 5, wherein the driving device comprises two guide elements extending on either side of said driving device and cooperating with two rails formed in the receiving surface.

7. A vehicle trim element comprising a control device according to claim 1, wherein the receiving surface is formed by at least part of the outer surface of the trim element.

8. A vehicle comprising a trim element according to claim 7, wherein the trim element extends opposite the driver seat and the passenger seat, or between the driver seat and the passenger seat.

9. The vehicle according to claim 8, further comprising a return element arranged to return the driving device to its extreme close position.

10. The vehicle according to claim 9, wherein the return element is arranged to return the driving device to its extreme close position after a certain nonuse time.

11. A control device for controlling at least one function of a vehicle, comprising a driving device for driving said function, a display device for displaying at least one piece of information relative to said function and a surface for receiving said driving device and said display device, wherein said driving device is mounted translatably on the receiving surface and relative to the display device, the distance between the display device and the driving device being adjustable by moving said driving device relative to said display device, wherein the driving device is movable between an extreme close position, in which the driving device is adjacent to and is applied against the display device, and an extreme distant position, in which the driving device extends opposite the passenger seat of the vehicle or between the driver seat and the passenger seat, further comprising a return element arranged to return the driving device to its extreme close position, wherein the return element is a driving element provided on the control device, wherein the driving element is configured to move the driving device automatically without intervention from an occupant of the vehicle, wherein the return element is arranged to automatically return the driving device to its extreme close position after a certain nonuse time.

12. A control device for controlling at least one function of a vehicle, comprising a driving device for driving said function, a display device for displaying at least one piece of information relative to said function and a surface for receiving said driving device and said display device, wherein said driving device is mounted translatably on the receiving surface and relative to the display device, the distance between the display device and the driving device being adjustable by moving said driving device relative to said display device, wherein the driving device comprises at least one guide element cooperating with a rail formed in the receiving surface so as to allow translation of the driving device on the receiving surface, wherein the rail extends toward an interior of the receiving surface, and wherein the display device mounted in a central area of the dashboard between a driver seat and a passenger seat of the vehicle, wherein the driving device is movable between an extreme close position, in which the driving device is adjacent to and is applied against the display device, and an extreme distant position, in which the driving device extends opposite the passenger seat of the vehicle or between the driver seat and the passenger seat.

* * * * *